(12) United States Patent
Larson

(10) Patent No.: US 9,233,592 B2
(45) Date of Patent: Jan. 12, 2016

(54) CLIMATE CONTROL SYSTEM FOR THE INTERIOR OF AN ELECTRIC DRIVE VEHICLE

(75) Inventor: Gerald L. Larson, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 416 days.

(21) Appl. No.: 13/809,422

(22) PCT Filed: Jul. 14, 2010

(86) PCT No.: PCT/US2010/041969
§ 371 (c)(1),
(2), (4) Date: Jan. 10, 2013

(87) PCT Pub. No.: WO2012/008956
PCT Pub. Date: Jan. 19, 2012

(65) Prior Publication Data
US 2013/0098577 A1   Apr. 25, 2013

(51) Int. Cl.
*B60H 1/00* (2006.01)
*B60H 1/14* (2006.01)
*B60H 1/22* (2006.01)
*B60H 1/32* (2006.01)

(52) U.S. Cl.
CPC ........ *B60H 1/00021* (2013.01); *B60H 1/00392* (2013.01); *B60H 1/00899* (2013.01); *B60H 1/143* (2013.01); *B60H 1/22* (2013.01); *B60H 1/3204* (2013.01); *B60L 2270/46* (2013.01)

(58) Field of Classification Search
CPC . B60H 1/00385; B60H 1/00392; B60K 11/02
See application file for complete search history.

(56) References Cited

U.S. PATENT DOCUMENTS

| | | | |
|---|---|---|---|
| 3,752,223 A | 8/1973 | Finch | |
| 5,421,169 A * | 6/1995 | Benedict | 62/244 |
| 5,549,153 A | 8/1996 | Baruschke et al. | |
| 6,089,034 A | 7/2000 | Lake et al. | |
| 6,118,099 A | 9/2000 | Lake et al. | |
| 6,363,732 B1 | 4/2002 | Bluhm | |
| 6,705,101 B2 * | 3/2004 | Brotz et al. | 62/198 |
| 6,827,141 B2 | 12/2004 | Smith et al. | |
| 6,851,470 B2 | 2/2005 | Laukhuf | |
| 6,889,762 B2 * | 5/2005 | Zeigler et al. | 165/240 |
| 6,962,195 B2 | 11/2005 | Smith et al. | |
| 6,971,446 B2 | 12/2005 | Price et al. | |
| 7,530,390 B2 | 5/2009 | Feuerecker | |
| 7,614,368 B2 | 11/2009 | Gehres et al. | |
| 2009/0205350 A1 | 8/2009 | Takahashi et al. | |

FOREIGN PATENT DOCUMENTS

JP   2008006894 A2   1/2008
WO   WO 2010/071540 A1   6/2010

* cited by examiner

*Primary Examiner* — Katy M Ebner
(74) *Attorney, Agent, or Firm* — Jeffrey P. Calfa; Mark C. Bach

(57) ABSTRACT

A climate control system (26) for a cabin (22) of an electric vehicle (10) has at least one liquid-to-air heat exchanger (38) in heat exchange relation with air in the cabin and a set of control valves for selectively placing the climate control system in a cabin heating mode of operation in which hot liquid circulates through a hot liquid flow loop (42) and in a cabin cooling mode of operation in which cold liquid circulates through a cold liquid flow loop (44). An electric compressor motor (30M) is operated by electricity from a battery bank (16) for operating a refrigerant compressor (30C) to circulate refrigerant in a refrigerant loop that comprises a refrigerant-to-liquid hot side heat exchanger (32) that provides the hot liquid and a refrigerant-to-liquid cold side heat exchanger (36) that provides the cold liquid.

11 Claims, 6 Drawing Sheets

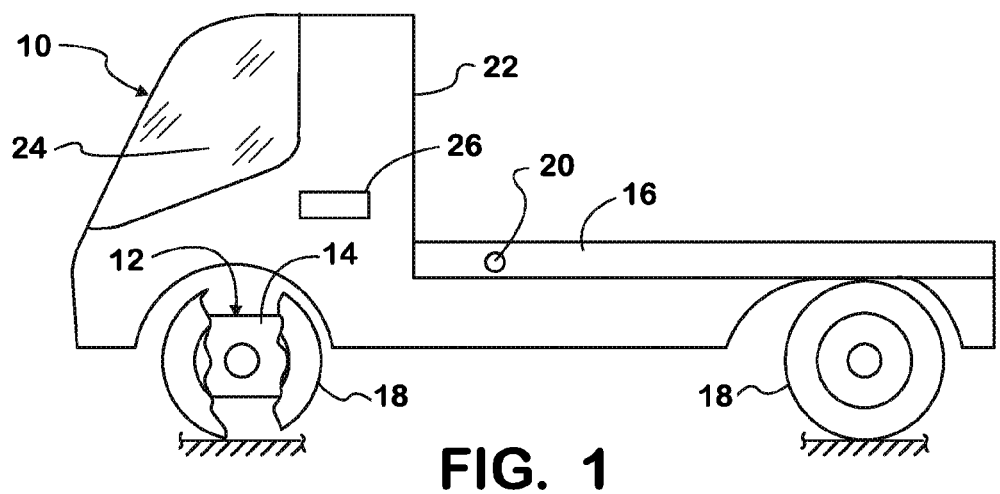
FIG. 1
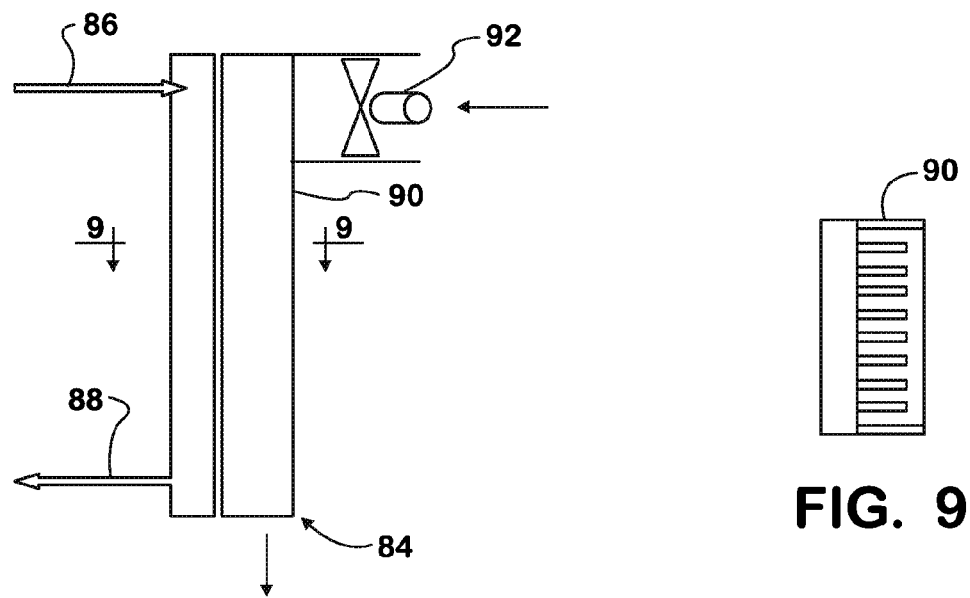
FIG. 8
FIG. 9

CLIMATE CONTROL SYSTEM FOR THE INTERIOR OF AN ELECTRIC DRIVE VEHICLE

FIELD OF THE DISCLOSURE

This disclosure relates to electric drive vehicles, and in particular it relates to a climate control system for such vehicles.

BACKGROUND OF THE DISCLOSURE

A wheeled vehicle, such as a car or truck, that is propelled solely by an electric motor, sometimes referred to as a traction motor, that draws electric current from an on-board source of electricity, such as a battery bank, has a range of travel that is limited not only by how it is driven and the physical characteristics of the geographical area within which it travels, but also by the amount of on-board stored energy that the on-board source can deliver to the motor.

Because the propulsion system of such a vehicle lacks a combustion engine that is powered by fuel combusted in combustion chambers and therefore also lacks a liquid cooling system through which liquid coolant circulates to cool the engine, hot liquid coolant is unavailable for heating the interior of a cabin, or cab, for a driver of the vehicle. If the cabin is to be heated and windows are to be defrosted, another source of heat is used. Consequently, it is known to use electric heaters in such vehicles, but if such a heater draws electric current from the on-board source that also serves the electric traction motor that propels the vehicle, it does so at the expense of limiting the vehicle's range of travel for a given quantity of energy that is stored on-board at the start of travel.

If such a vehicle has an air conditioning system for cooling the cabin, that system too may draw electricity from the on-board source, and in doing so also limit the vehicle's range of travel.

SUMMARY OF THE DISCLOSURE

This disclosure introduces a climate control system for the interior of a cabin of a wheeled vehicle that is propelled by an electric traction motor that draws electricity from an on-board source of electricity. The climate control system comprises a heat pump that can provide both heating and cooling of the cabin interior.

While the heat pump is operated by its own electric motor that draws electric current from the same on-board source of electricity as the electric traction motor when the vehicle is being driven, the heating efficiency of a heat pump is significantly greater than that of an electric heater, and its cooling efficiency is significantly greater than that of the typical air conditioning system of a vehicle propelled by a fuel burning prime mover. Current heat pump technology can provide a COP (coefficient of performance) in the range of about 3.5, meaning that for one watt of energy input, the heat pump can provide about 3.5 watts of heat output for heating and a similar cooling output for cooling. Heat pump performance can also be characterized by an EER (energy efficiency rating), calculated by dividing the BTU heating or cooling output by the power input in watts.

As generally claimed, this disclosure relates to a vehicle comprising wheels on which the vehicle travels, an electric traction motor for rotating at least some of the wheels to propel the vehicle, a battery bank on-board the vehicle for operating the electric traction motor, a cabin for a driver of the vehicle, and a climate control system for the cabin.

The climate control system comprises at least one liquid-to-air cabin air heat exchanger in heat exchange relation with air in the cabin, a refrigerant compressor, an electric compressor motor operated by the battery bank for operating the refrigerant compressor to circulate refrigerant in a refrigerant loop from the compressor through a refrigerant-to-liquid hot side heat exchanger within which refrigerant condenses, then through an expansion valve, then through a refrigerant-to-liquid cold side heat exchanger within which refrigerant that has passed through the expansion valve expands, and then back to the refrigerant compressor, the climate control system further comprising a liquid flow loop for circulating liquid through one of the refrigerant-to-liquid heat exchangers and the cabin air heat exchanger.

As generally claimed, this disclosure also relates to a vehicle having wheels, electric traction motor, battery bank and cabin as described, in which a climate control system for the cabin comprises at least one liquid-to-air cabin air heat exchanger in heat exchange relation with air in the cabin, a refrigerant compressor, an electric compressor motor operated by the battery bank for operating the refrigerant compressor to circulate refrigerant in a refrigerant loop from the refrigerant compressor through a refrigerant-to-liquid hot side heat exchanger for condensing refrigerant, then through an expansion valve, then through a refrigerant-to-liquid cold side heat exchanger for expanding refrigerant that has passed through the expansion valve, and then back to the refrigerant compressor, the climate control system further comprising a hot liquid flow loop for circulating liquid through the hot side heat exchanger and the cabin air heat exchanger and a cold liquid flow loop for circulating liquid through the cold side heat exchanger and the cabin air heat exchanger, and a set of control valves for selectively placing the climate control system in a cabin heating mode of operation for directing liquid to circulate through the hot liquid flow loop to the exclusion of circulation of liquid through the cold liquid flow loop and placing the climate control system in a cabin cooling mode of operation for directing liquid to circulate through the cold liquid flow loop to the exclusion of circulation of liquid through the hot liquid flow loop.

As generally claimed, this disclosure also relates to a climate control system for an enclosed inside space comprising at least one liquid-to-air inside air heat exchanger in heat exchange relation with air in the enclosed inside space, a refrigerant compressor, a refrigerant-to-liquid hot side heat exchanger for condensing refrigerant, an expansion valve, a refrigerant-to-liquid cold side heat exchanger for expanding refrigerant, and an electric motor for operating the refrigerant compressor to circulate refrigerant unidirectionally in a loop through the hot side heat exchanger, then through the expansion valve, then back to the compressor.

A set of control valves selectively places the climate control system in an inside air heating mode of operation for directing liquid to circulate through a hot liquid flow loop that comprises the at least one inside air heat exchanger and the hot side heat exchanger but excludes the cold side heat exchanger, and in an inside air cooling mode of operation for directing liquid to circulate through a cold liquid flow loop that comprises the at least one inside air heat exchanger and the cold side heat exchanger but excludes hot side heat exchanger.

As generally claimed, this disclosure also relates to a method for climate control of a driver's cabin of a vehicle that has wheels on which the vehicle travels, an electric traction motor for rotating at least some of the wheels to propel the vehicle, a battery bank on-board the vehicle for operating the electric traction motor, and at least one liquid-to-air cabin air heat exchanger in heat exchange relation with air in the cabin.

The method comprises using electricity from the battery bank to operate an electric-motor-driven refrigerant compressor to circulate refrigerant in a refrigerant loop from the refrigerant compressor through a hot side heat exchanger that condenses refrigerant, then through an expansion valve, then through a cold side heat exchanger that expands refrigerant, and then back to the refrigerant compressor, and selectively operating a set of control valves to select a cabin air heating mode of operation for directing liquid to circulate through a hot liquid flow loop that comprises the at least one cabin air heat exchanger and the hot side heat exchanger but excludes the cold side heat exchanger, and a cabin air cooling mode of operation that causes liquid to circulate through a cold liquid flow loop that comprises the at least one cabin air heat exchanger and the cold side heat exchanger but excludes hot side heat exchanger.

As generally claimed, this disclosure also relates to a vehicle comprising wheels on which the vehicle travels, an electric traction motor for rotating at least some of the wheels to propel the vehicle, a battery bank on-board the vehicle for operating the electric traction motor, power electronics associated with the battery bank and the electric traction motor, a cabin for a driver of the vehicle, a climate control system for the cabin comprising at least one liquid-to-air cabin air heat exchanger in heat exchange relation with air in the cabin, a set of control valves for selectively placing the climate control system in a cabin heating mode of operation for directing hot liquid to circulate through a hot liquid flow loop and placing the climate control system in a cabin cooling mode of operation for directing cold liquid to circulate through a cold liquid flow loop, a refrigerant compressor, an electric motor providing electricity to the battery bank for operating the refrigerant compressor to circulate refrigerant in a refrigerant loop that comprises a refrigerant-to-liquid hot side heat exchanger that provides the hot liquid and a refrigerant-to-liquid cold side heat exchanger that provides the cold liquid, and a liquid waste heat removal circuit controlled by the set of control valves for directing liquid to circulate through the cold side heat exchanger and at least one of the traction motor, the battery bank, and the power electronics in the cabin heating mode and for directing liquid to circulate through a radiator that is external to the cabin and at least one of the traction motor, the battery bank, and the power electronics in the cabin cooling mode.

The foregoing summary, accompanied by further detail of the disclosure, will be presented in the Detailed Description below with reference to the following drawings that are part of this disclosure.

BRIEF DESCRIPTION OF THE DRAWINGS

FIG. 1 is a side elevation view of a representative electric vehicle having a climate control system for a cabin.

FIG. 8 shows an additional element associated with an element present in FIG. 2.

FIG. 9 is a view in the direction of arrows 9-9 in FIG. 8.

DETAILED DESCRIPTION

Figure 2:
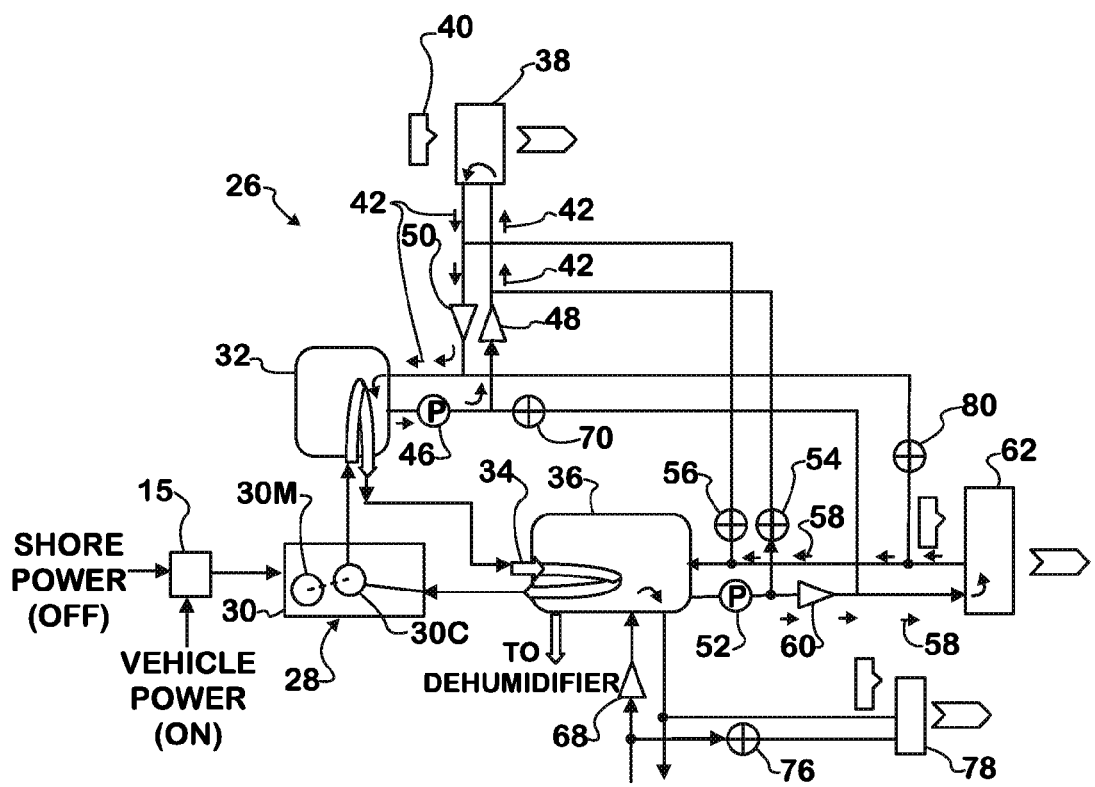
FIG. 2 is a schematic diagram of the climate control system in the vehicle of FIG. 1.

FIG. 1 shows an electric vehicle 10 having a powertrain 12 that includes an electric traction motor 14. Traction motor 14 is operated by electric current from an on-board source of electricity, such as a battery bank 16 comprising at least one D.C. battery. When traction motor 14 is being operated to propel vehicle 10, powertrain 12 is coupling traction motor 14 to at least some wheels 18 on which vehicle 10 travels to rotate those wheels and cause them to propel the vehicle. The vehicle shown in FIG. 1 is representative of a front wheel drive platform in which traction motor 14 drives front steered wheels. Power electronics 15 (FIG. 4) are associated with battery bank 16 for delivering electricity to traction motor 14 and for re-charging battery bank 16 when connected to shore power (not shown) via a connector 20.

Vehicle 10 further comprises a cabin (a.k.a. a cab or an occupant compartment) 22 having an interior 24 for at least one occupant that includes a driver of the vehicle. Vehicle 10 also has a climate control system 26 for selectively heating and cooling interior 24.

Climate control system 26 is shown in FIG. 2 to comprise a heat pump system 28 that comprises a heat pump 30, a hot side heat exchanger (condenser) 32, an expansion valve 34, and a cold side heat exchanger (evaporator) 36. Both hot side heat exchanger 32 and cold side heat exchanger 36 are refrigerant-to-liquid heat exchangers.

Heat pump 30 comprises a refrigerant compressor 30C for compressing refrigerant and an electric compressor motor 30M for operating refrigerant compressor 30C. Electric current for operating electric compressor motor 30M is sourced from battery bank 16 when vehicle 10 is being propelled by traction motor 14. When vehicle 10 is parked and connector 20 is connected to shore power, electric current for operating electric compressor motor 30M is in effect sourced from shore power through battery bank 16 because charge that is being drawn from battery bank 16 to operate refrigerant compressor motor 30M is being continuously replenished by charge from shore power through on-board power electronics 15.

When heat pump 30 operates, refrigerant compressor 30C draws evaporated refrigerant from an outlet of cold side heat exchanger 36 and compresses the refrigerant to force liquid refrigerant flow through hot side heat exchanger 32 to an inlet of expansion valve 34. An outlet of expansion valve 34 is open to an inlet of cold side heat exchanger 36 to allow refrigerant to expand as it passes through cold side heat exchanger 36, and then exits to complete the refrigerant circuit back to refrigerant compressor 30C. This creates a temperature difference between hot side heat exchanger 32 and cold side heat exchanger 36.

Climate control system 26 further comprises a cabin air heat exchanger 38 of the liquid-to-air type that serves to condition air in cabin interior 24 by either heating or cooling the air. Heating occurs when climate control system 26 is placed in a cabin heating mode with heat pump system 28 operating. Cooling occurs when climate control system 26 is placed in a cabin cooling mode with heat pump system 28 operating. Air that is being conditioned is circulated through cabin air heat exchanger 38 by an electric-operated blower 40.

Climate control system 26 further comprises a hot liquid flow loop 42 (indicated by the arrows so marked in both FIG. 2 and FIG. 3) between hot side heat exchanger 32 and cabin air heat exchanger 38. Climate control system also comprises a cold liquid flow loop 44 (indicated by the arrows so marked in FIG. 4) between cold side heat exchanger 36 and cabin air heat exchanger 38. A representative liquid used in the flow loops is a mixture of water and ethylene glycol.

Hot liquid flow loop 42 contains an electric-operated pump 46, a shut-off valve 48, and a shut-off valve 50. Both shut-off valves 48, 50 are electric-operated. In the heating mode represented by both FIG. 2 and FIG. 3, both valves 48, 50 are operated open and pump 46 operates to circulate liquid through hot liquid flow loop 42.

Cold liquid flow loop 44 contains an electric-operated pump 52, a shut-off valve 54, and a shut-off valve 56. Both shut-off valves 54, 56 are electric-operated. In the heating mode, both shut-off valves 54, 56 are operated closed.

Figure 3:
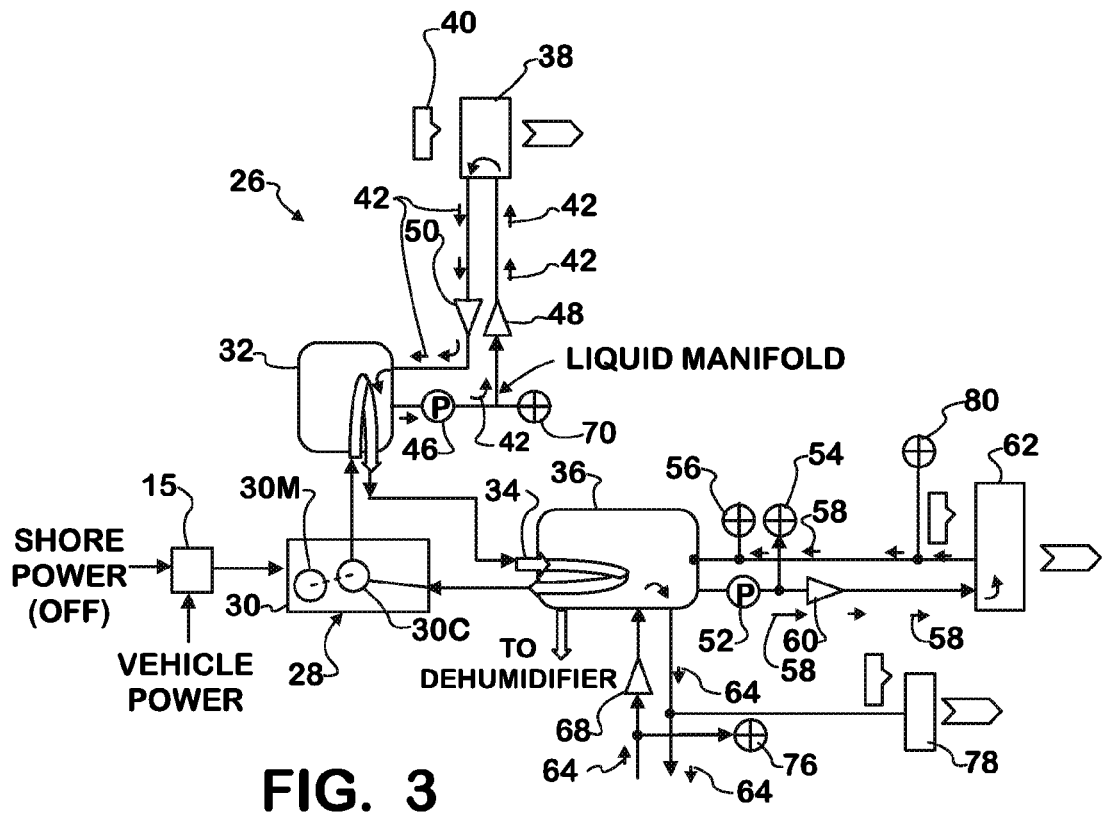
FIG. 3 is a schematic diagram showing a first operating mode that uses on-board electric power for operating the climate control system shown in FIG. 2.

FIG. 2 and FIG. 3 further show a supplemental liquid flow loop 58 associated with cold side heat exchanger 36. In addition to pump 52, supplemental liquid flow loop 58 comprises an electric-operated shut-off valve 60 and a heat pump heat exchanger 62. In the heating mode, shut-off valve 60 is operated open. Pump 52 operates to pump liquid from cold side heat exchanger 36 through shut-off valve 60 and through heat pump heat exchanger 62, with liquid flow out of heat pump heat exchanger 62 returning to cold side heat exchanger 36.

Heat pump heat exchanger 62 is in heat exchange relation with ambient air that is outside cabin interior 24. Transfer of thermal energy occurs from relatively warmer ambient air moving across heat transfer surfaces of heat pump heat exchanger 62 to relatively cooler liquid circulating in supplemental liquid flow loop 58. The transferred energy is conveyed by the circulating liquid to cold side heat exchanger 36 where the energy is transferred by heat pump system 28 to liquid circulating in hot liquid flow loop 42 and ultimately cabin interior 24.

Figure 4:
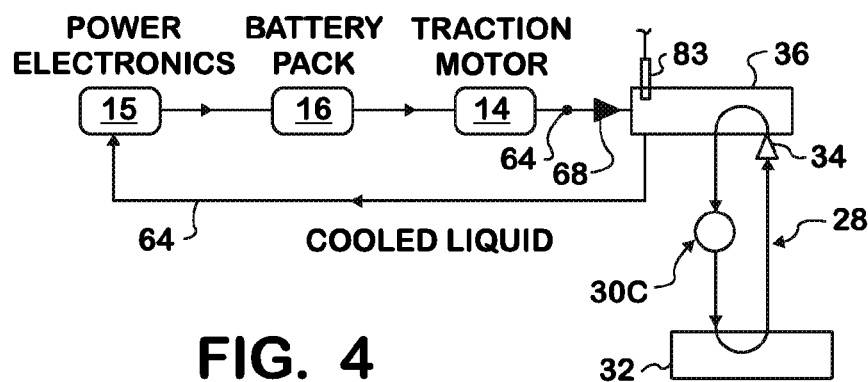
FIG. 4 is a schematic diagram showing a liquid circuit associated with a portion of the schematic diagram of FIG. 3.

A waste heat liquid flow loop 64 is associated with cold side heat exchanger 36. Waste heat liquid flow loop 64 comprises at least one on-board electrical device that generates heat. FIG. 4 shows waste heat liquid flow loop 64 to comprise heat exchangers associated with battery bank 16, traction motor 14, and power electronics 15. Because such electrical devices can at times generate amounts of heat that could cause overheating, liquid cooling is typically used for cooling both motors and power electronics; hence, heat exchangers may already be present in a base electric vehicle and available for use with the climate control system being described here. The intent of FIG. 4 is to show the recapture of what might otherwise be waste heat and its use for additional cabin heating and therefore, except for an electric-operated return shut-off valve 68 (also shown in FIG. 2), FIG. 4 does not include specific circuit details that could include one or more pumps and various additional valves interrelating cold side heat exchanger 36 with the heat exchangers associated with battery bank 16, traction motor 14, and power electronics 15.

When any such electrical device is generating sufficient heat in the heating mode of climate control system 26, return shut-off valve 68 is operated open so that liquid circulates through the heat exchanger associated with the electrical device and cold side heat exchanger 36 to cause heat from the electrical device to be transferred to refrigerant passing through cold side heat exchanger 36. FIG. 4 shows waste heat liquid flow loop 64 directing liquid to circulate first through power electronics 15, then battery bank 16, and then traction motor 14 in the cabin heating mode. In this way the coolest liquid cools power electronics 15 which typically have the lowest high temperature limit while traction motor 14 typically has the highest high temperature limit. Thermal energy of the transferred waste heat is further transferred by heat pump system 28 to liquid circulating in hot liquid flow loop 42 and ultimately cabin interior 24.

FIG. 3 is like FIG. 2, but with some conduits removed, so that the three liquid flow loops 42, 58, and 64 through which liquid flows in the heating mode with climate control system 26 being operated by battery bank 16 are perhaps more easily seen. FIGS. 2 and 3 also show an additional electric-operated shut-off valve 70 that is operated closed in the heating mode.

Figure 5:
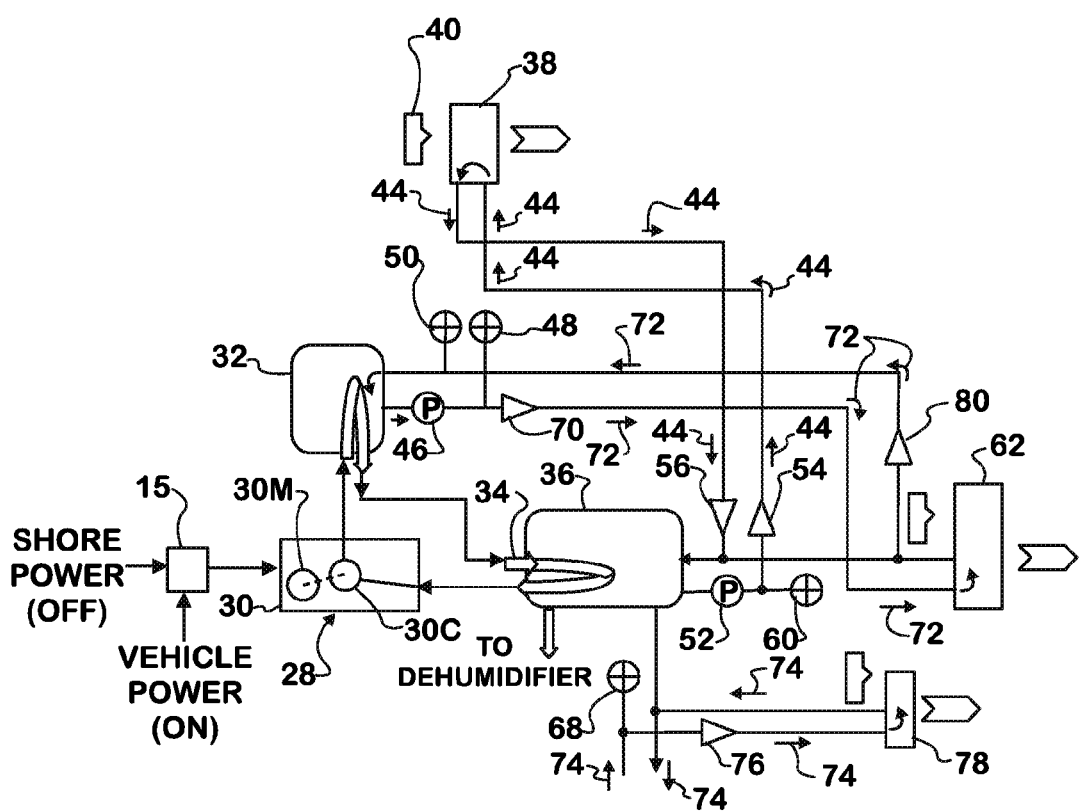
FIG. 5 is a schematic diagram showing a second operating mode that uses on-board electric power for operating the climate control system shown in FIG. 2.

FIG. 5 is also like FIG. 2, but with different conduits removed from those removed in FIG. 4, so that flow loops through which liquid circulates in the cooling mode with climate control system 26 being operated by battery bank 16 are perhaps more easily seen. In the cooling mode, no liquid flows through hot liquid flow loop 42, supplemental liquid flow loop 58, or waste heat liquid flow loop 64 because shut-off valves 48, 50, 60, and 68 are operated closed, and instead, shut-off valves 54, 56 are operated open and pump 52 is operated to cause liquid flow through cold liquid flow loop 44.

In the cooling mode, flow also occurs through another liquid flow loop 72. Shut-off valve 70 is operated open and pump 46 is operated. An electric-operated shut-off valve 80 in a return conduit from heat exchanger 62 to hot-side heat exchanger 32 is also operated open. Heat from hot side heat exchanger 32 is rejected to ambient outside air by heat pump heat exchanger 62, allowing heat pump system 28 to convey more heat from cold side heat exchanger 36, thereby keeping the latter cold. Shut-off valve 80 is shown closed in FIGS. 2 and 3 with climate control system 26 in the heating mode.

In the cooling mode, flow also occurs through a liquid flow loop 74 that unlike liquid flow loops 42, 44, 58, 64, and 72 is not associated with heat pump system 28. Liquid flow loop 74 comprises an electric-operated shut-off valve 76 that when operated open provides for heated liquid coming from any one or more of the heat exchangers associated with battery bank 16, traction motor 14, and power electronics 15 to flow through a heat exchanger 78 where heat is rejected, such as to ambient air outside cabin 22. In the heating mode, shut-off valve 76 can be operated open for recapture of heat generated by any one or more of battery bank 16, traction motor 14, and power electronics 15.

Figure 6:
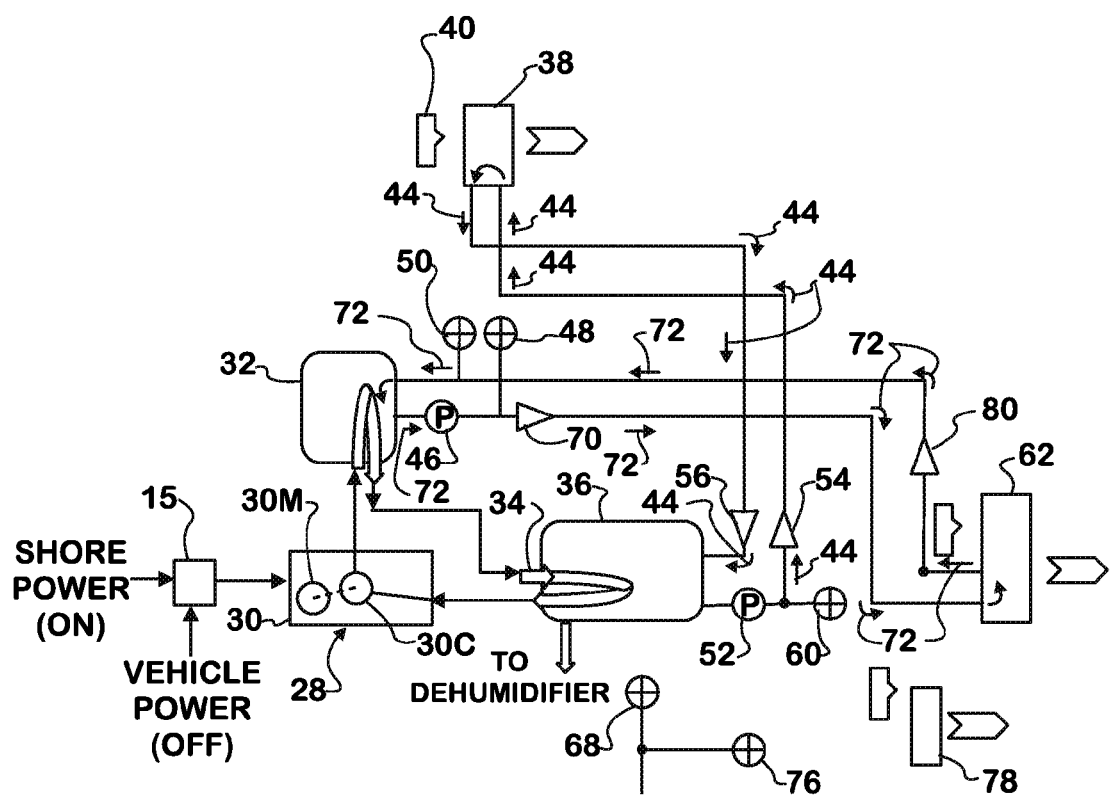
FIG. 6 is a schematic diagram showing a third operating mode that uses shore electric power for operating the climate control system shown in FIG. 2.

FIG. 6 shows operation in the cooling mode using shore power in the manner explained above. With traction motor 14 and associated electronics not operating, shut-off valves 68 and 76 can be operated closed. Otherwise the flows are like those shown in FIG. 5.

Figure 7:
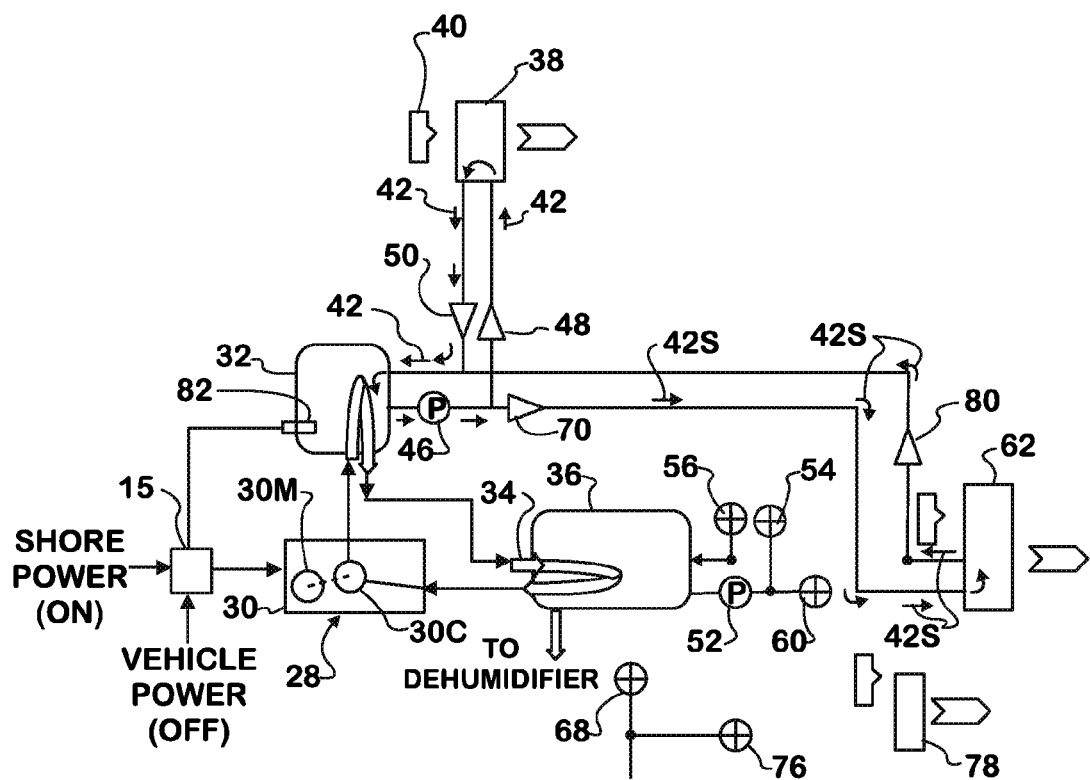
FIG. 7 is a schematic diagram showing a fourth operating mode that uses shore electric power for operating the climate control system shown in FIG. 2.

FIG. 7 shows operation in the heating mode using shore power in the manner explained above. With traction motor 14 and associated electronics not operating, shut-off valves 68 and 76 can be operated closed. Shut-off valves 48, 50 are operated open and pump 46 is operated to circulate liquid in hot liquid flow loop 42. Because battery bank 16 is not being drained by operating pump 46 and heat pump 30, some liquid pumped by pump 46 can be shunted through a supplemental liquid flow loop 42S through heat pump heat exchanger 62 by operating shut-off valves 70 and 80 open. This serves to keep heat pump heat exchanger 62 and the associated conduits in supplemental liquid flow loop 42S warm in cold ambient conditions while also providing cabin heating so that when electric vehicle 10 is first operated by battery bank power after having been parked in cold ambient temperatures (such as overnight cold-soak), battery bank power is not needed to warm up heat pump heat exchanger 62 and associated conduits.

With electric vehicle 10 parked in a cold ambient environment, cabin heating may not be needed in which case heat pump 30 may not operate. Hot liquid flow loop 42 and supplemental liquid flow loop 42S can be kept warm however by an electric resistance heater 82 that uses shore power. FIG. 7 shows such a heater 82 associated with hot side heat exchanger 32. Operation of pump 46 may be unnecessary if heat input from heater 82 can convectively transfer through the two liquid flow loops 42, 42S. Heat pump heat exchanger 62 should be sufficiently heated during cold weather operation to avoid formation of frost and ice build-up which if unchecked reduces its functionality.

In the same way an electric resistance heater 83 operated by shore power can be associated with the loop comprising power electronics 15, battery bank 16, and traction motor 14 in FIG. 4 to provide warm water-ethylene glycol fluid circulation for warming them in cold ambient weather.

When electric vehicle 10 is driven and shore power is unavailable, waste heat from power electronics 15, battery bank 16, and traction motor 14 can be circulated through heat pump heat exchanger 62. Heat that is added to heat pump heat exchanger 62 is effective to counter frost and ice formation and extends the range of low temperature operation for the heat pump to even lower ambient temperatures.

FIGS. 2, 3, and 5-7 contain references to a dehumidifier associated with heat pump system 28 for dehumidifying cabin air when a defog mode is selected. FIGS. 8 and 9 show detail of a modular dehumidifier 84 that provides a compact means for removing humidity with a small airflow, thus not removing much heat from the cabin during cold weather operation when the defog mode is selected.

Liquid from cold side heat exchanger 36 enters dehumidifier 84 through an inlet 86 and returns through an outlet 88. A finned heat sink 90 on the dehumidifier exterior provides a substantial surface area for heat exchange between cabin air and liquid flowing through dehumidifier 84. A blower 92 may force the cabin air across the heat exchange surface area.

The dehumidifier functions as a window defogger by removing humidity from cabin air. Defog is controlled by operating blower 92 at a cabin air recirculation rate that reduces humidity without removing excessive cabin heat. The defog mode may be selected contemporaneously with the cabin heating mode.

Heat pump system 28 may embody heat pump 30, hot side heat exchanger 32, expansion valve 34, and cold side heat exchanger 36 as a modular unit with compressor 30C being hermetically sealed. Because refrigerant is always pumped the same direction in both heating and cooling modes, no steering valves for steering refrigerant are used. Steering is instead performed in the liquid circuit.

Compressor motor 30M may be a permanent magnet type, with electronic-commutated drive providing high efficiency and capable of operation over a range of power source voltages.

The cabin may have two cabin air heat exchangers 38, not just a single one as shown in the Figures: one above the driver that is used in the cooling mode, the other within ducting in a low location that is used in the heating mode for heating and defrost functions.

Rather than operating electric compressor motor 30M to provide cabin heating when electric vehicle 10 is parked and connector 20 is connected to shore power, cabin heating could be provided by an electric resistance heater (not shown) in cabin 22 that is directly operated by AC shore power. This would avoid having to provide an AC-to-DC converter for operating a DC electric compressor motor 30M.

What is claimed is:

1. A vehicle comprising:
   wheels on which the vehicle travels;
   an electric traction motor for rotating at least some of the wheels to propel the vehicle;
   a battery bank on-board the vehicle for operating the electric traction motor;
   a cabin for a driver of the vehicle;
   a climate control system for the cabin comprising at least one liquid-to-air cabin air heat exchanger in heat exchange relation with air in the cabin, a refrigerant compressor, an electric compressor motor operated by the battery bank for operating the refrigerant compressor to circulate refrigerant in only a single refrigerant loop having only a single refrigerant-to-liquid cold side heat exchanger, the refrigerant circulating from the compressor through a refrigerant-to-liquid hot side heat exchanger within which refrigerant condenses, then through an expansion valve, then through the only single refrigerant-to-liquid cold side heat exchanger within which refrigerant that has passed through the expansion valve expands, and then back to the refrigerant compressor, the climate control system further comprising a first liquid flow loop for circulating liquid first through the refrigerant-to-liquid hot side heat exchanger or the only single refrigerant-to-liquid cold side heat exchanger and then through the at least one liquid-to-air cabin air heat exchanger; and
   power electronics associated with the battery bank and the electric traction motor, and a second liquid flow loop for circulating liquid through the only single refrigerant-to-liquid cold side heat exchanger and at least one of the electric traction motor, the battery bank, and the power electronics.

2. The vehicle as set forth in claim 1 in which the first liquid flow loop comprises the only single refrigerant-to-liquid cold side heat exchanger and the at least one liquid-to-air cabin air heat exchanger.

3. The vehicle as set forth in claim 2 further comprising;
   a liquid-to-air outside air heat exchanger in heat exchange relation with ambient air outside the cabin, and a third liquid flow loop for circulating liquid through the refrigerant-to-liquid hot side heat exchanger and the liquid-to-air outside air heat exchanger.

4. The vehicle as set forth in claim 1, wherein:
   the first liquid flow loop comprises the refrigerant-to-liquid hot side heat exchanger and the at least one liquid-to-air cabin air heat exchanger.

5. The vehicle as set forth in claim 4, further comprising:
   a liquid-to-air outside air heat exchanger in heat exchange relation with ambient air outside the cabin, and a third liquid flow loop for circulating liquid through the liquid-to-air outside air heat exchanger and the only single refrigerant-to-liquid cold side heat exchanger.

6. A vehicle comprising:
   wheels on which the vehicle travels;
   an electric traction motor for rotating at least some of the wheels to propel the vehicle;
   a battery bank on-board the vehicle for operating the electric traction motor;
   a cabin for a driver of the vehicle;
   a climate control system for the cabin comprising at least one liquid-to-air cabin air heat exchanger in heat exchange relation with air in the cabin, a refrigerant compressor, an electric compressor motor operated by the battery bank for operating the refrigerant compressor to circulate refrigerant in only a single refrigerant loop having only a single refrigerant-to-liquid cold side heat exchanger, the refrigerant circulating from the refrigerant compressor through a refrigerant-to-liquid hot side heat exchanger for condensing refrigerant, then through an expansion valve, then through the only single refrigerant-to-liquid cold side heat exchanger for expanding refrigerant that has passed through the expansion valve, and then back to the refrigerant compressor, the climate control system further comprising a hot liquid flow loop for circulating liquid through the refrigerant-to-liquid hot side heat exchanger and the at least one liquid-to-air cabin air heat exchanger and a cold liquid flow loop for circulating liquid through the only single refrigerant-to-liquid cold side heat exchanger and the at least one liquid-to-air cabin air heat exchanger, and a set of control valves for selectively placing the climate control system in a cabin heating mode of operation that causes liquid to circulate through the hot liquid flow loop to the exclusion of circulation of liquid through the cold liquid flow loop and placing the climate control system in a cabin cooling mode of operation that causes liquid to circulate through the cold liquid flow loop to the exclusion of circulation of liquid through the hot liquid flow loop; and power electronics associated with the battery bank and the electric traction motor, and a liquid waste heat removal flow loop controlled by the set of control valves for circulating liquid through the only single refrigerant-to-liquid cold side heat exchanger and at least one of the electric traction motor, the battery bank, and the power electronics in the cabin heating mode, but not in the cabin cooling mode.

7. The vehicle as set forth in claim 6 comprising a connector that can be connected to shore power for recharging the battery bank from shore power when the electric traction motor is not operating, and an electric resistance heater for heating liquid in the hot liquid flow loop when the electric traction motor is not operating and the connector is connected to shore power.

8. The vehicle as set forth in claim 6, further comprising:
a liquid-to-air outside air heat exchanger in heat exchange relation with ambient air outside the cabin, a first supplemental liquid flow loop controlled by the set of control valves for circulating liquid through the liquid-to-air outside air heat exchanger and the only single refrigerant-to liquid cold side heat exchanger in the cabin heating mode, and a second supplemental liquid flow loop controlled by the set of control valves for circulating liquid through the liquid-to-air outside air heat exchanger and the refrigerant-to-liquid hot side heat exchanger in the cabin cooling mode.

9. A method for climate control of a driver's cabin of a vehicle that has wheels on which the vehicle travels, an electric fraction motor for rotating at least some of the wheels to propel the vehicle, a battery bank on-board the vehicle for operating the electric traction motor, and at least one liquid-to-air cabin air heat exchanger in heat exchange relation with air in the cabin, the method comprising:

using electricity from the battery bank to operate an electric-motor-driven refrigerant compressor to circulate refrigerant in only a single refrigerant loop having only a single refrigerant-to-liquid cold side heat exchanger, the refrigerant circulating from the refrigerant compressor through a hot side refrigerant-to-liquid heat exchanger that condenses refrigerant, then through an expansion valve, then through the only single refrigerant-to-liquid cold side heat exchanger that expands refrigerant, and then back to the refrigerant compressor;

and selectively operating a set of control valves to select a cabin air heating mode of operation for directing liquid to circulate through a hot liquid flow loop that comprises the at least one liquid-to-air cabin air heat exchanger and the hot side refrigerant-to-liquid heat exchanger but excludes the only single refrigerant-to-liquid cold side heat exchanger, and a cabin air cooling mode of operation for directing liquid to circulate through a cold liquid flow loop that comprises the at least one liquid-to-air cabin air heat exchanger and the only single refrigerant-to-liquid cold side heat exchanger but excludes the hot side refrigerant-to-liquid heat exchanger; and power electronics associated with the battery bank and the electric traction motor, and a third liquid flow loop for circulating liquid through the only single refrigerant-to-liquid cold side heat exchanger and at least one of the electric traction motor, the battery bank, and the power electronics.

10. A vehicle comprising:
wheels on which the vehicle travels;
an electric traction motor for rotating at least some of the wheels to propel the vehicle;
a battery bank on-board the vehicle for operating the electric traction motor;
power electronics associated with the battery bank and the electric traction motor;
a cabin for a driver of the vehicle;
a climate control system for the cabin comprising at least one liquid-to-air cabin air heat exchanger in heat exchange relation with air in the cabin, a set of control valves for selectively placing the climate control system in a cabin heating mode of operation for directing hot liquid to circulate through a hot liquid flow loop and placing the climate control system in a cabin cooling mode of operation for directing cold liquid to circulate through a cold liquid flow loop;
a refrigerant compressor, an electric compressor motor operated by electricity from the battery bank for operating the refrigerant compressor to circulate refrigerant in only a single refrigerant loop that comprises a refrigerant-to-liquid hot side heat exchanger that provides the hot liquid and only a single refrigerant-to-liquid cold side heat exchanger that provides the cold liquid;
and a liquid waste heat removal loop controlled by the set of control valves for directing liquid to circulate through the only single refrigerant-to-liquid cold side heat exchanger and at least one of the fraction motor, the battery bank, and the power electronics in the cabin heating mode and for directing liquid to circulate through a radiator that is external to the cabin and at least one of the fraction motor, the battery bank, and the power electronics in the cabin cooling mode.

11. The vehicle set forth in claim 10 in which the liquid waste heat removal loop flows liquid serially, first through the power electronics, then through the battery bank, and then through the traction motor.

* * * * *